United States Patent [19]
Briscoe

[11] 4,150,785
[45] Apr. 24, 1979

[54] TEMPERATURE CONTROLLED GABLE VENT

[76] Inventor: Harry H. Briscoe, Rte. 10 Burnett Ferry Rd., Rome, Ga. 30161

[21] Appl. No.: 849,238

[22] Filed: Nov. 7, 1977

Related U.S. Application Data

[62] Division of Ser. No. 752,565, Dec. 20, 1976, Pat. No. 4,125,222.

[51] Int. Cl.² ............................................. F24F 7/02
[52] U.S. Cl. ....................................... 236/49; 60/530; 236/99 F
[58] Field of Search ..................... 236/49, 99 F, 99 R, 236/100, 99 G; 60/530, 531

[56] References Cited

U.S. PATENT DOCUMENTS

| 1,618,792 | 2/1927 | Wood et al. | 236/49 |
| 3,007,029 | 10/1961 | Levine | 236/100 UX |
| 3,664,698 | 5/1972 | Stropkay | 60/531 X |

Primary Examiner—William E. Wayner
Attorney, Agent, or Firm—Newton, Hopkins & Ormsby

[57] ABSTRACT

A solar heat augmented heating system is disclosed in which a solar heat chamber located in an attic is employed selectively to supply heat to the heating system which heats the occupant space, thereby to decrease the load on the conventional heating system. This system is integrated with an improved form of automatically controlled gable vent.

2 Claims, 12 Drawing Figures

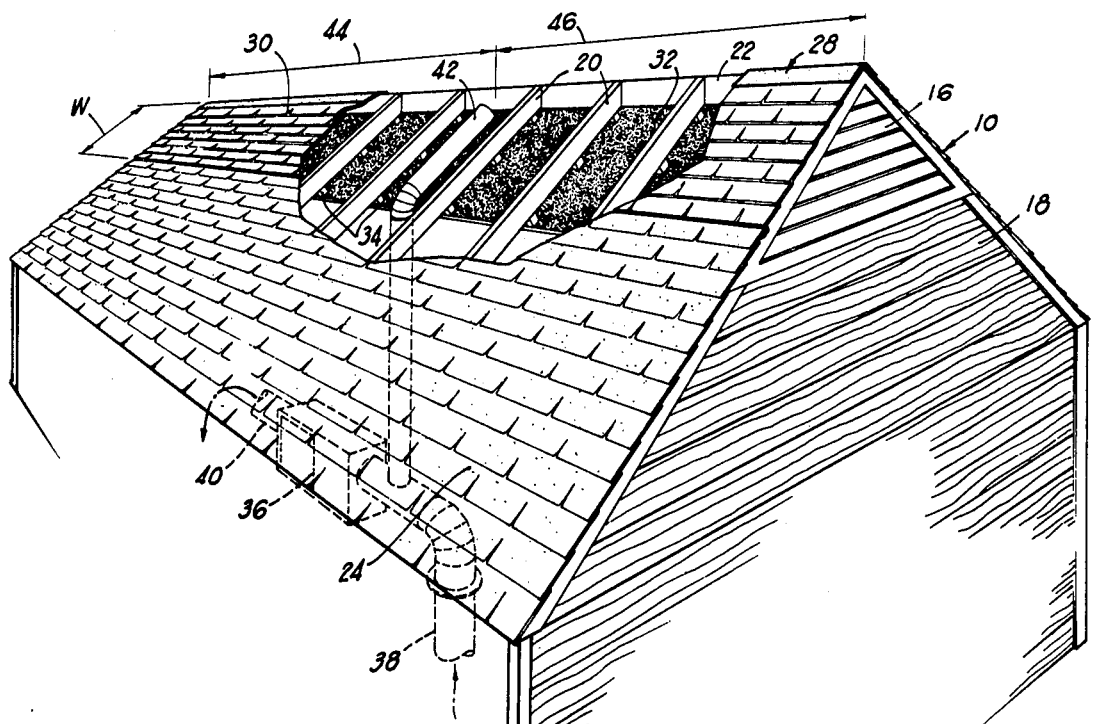
FIG 1
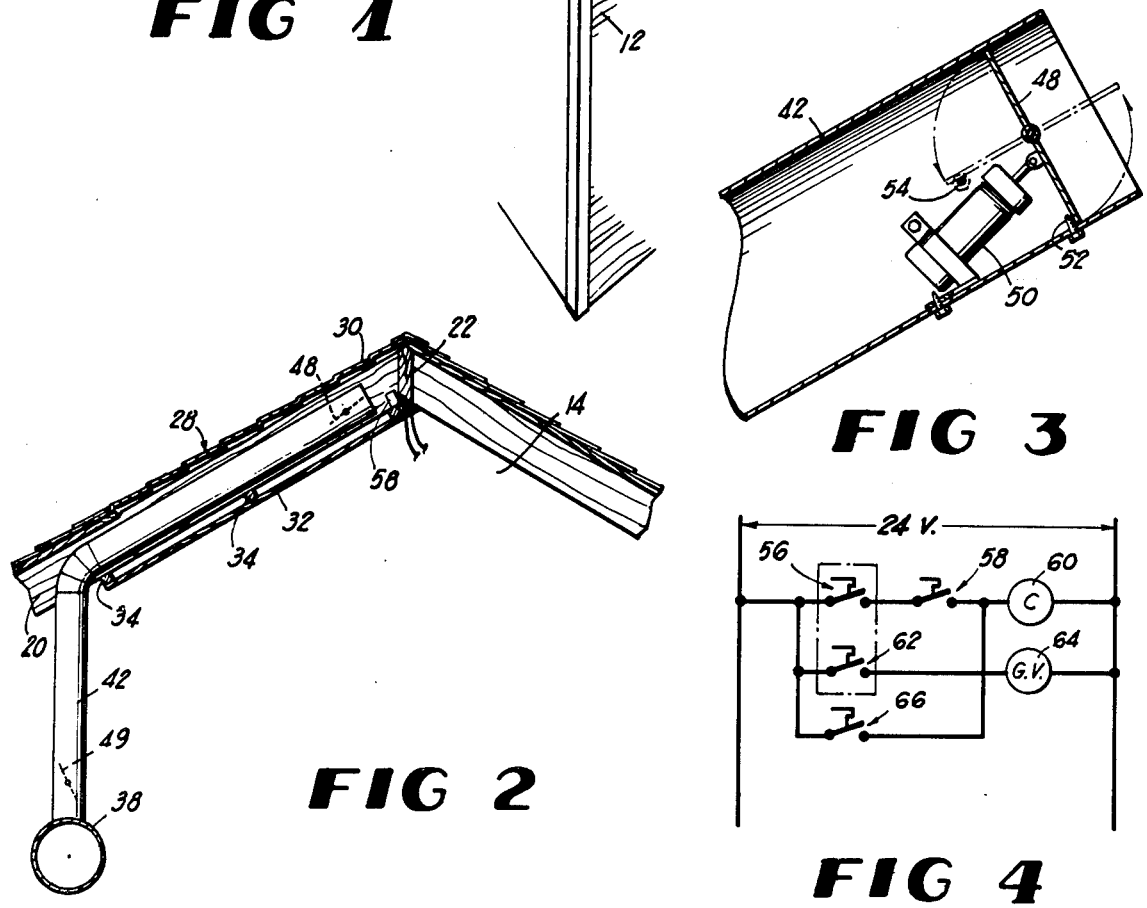
FIG 2
FIG 3
FIG 4

TEMPERATURE CONTROLLED GABLE VENT

This is a division of application Ser. No. 752,565, filed Dec. 20, 1976, now U.S. Pat. No. 4,125,222.

BACKGROUND OF THE INVENTION

Most homes and some commercial buildings that are constructed utilize gable roof framing. At the ridge of each gable a louvered vent is installed to relieve the high attic temperatures of the warmer season. Since these louvers are fixed in the open position, heat is lost in the winter season, resulting in higher costs to heat the dwelling.

The majority of heat loss from a building occurs through the windows and ceiling. In the case of the ceiling, insulation does reduce the heat transfer from the interior of the building to the attic space. However, no provision is made to reduce the large differential in the temperature between these two zones. If the gable vents were sealed in the winter season, then the average heating cost would be reduced approximately 9%. Sealing of the vents at the outset of cooler weather also presents a potential solar radiation problem. It is possible for an attic space to reach temperatures in excess of 120° F. even during the cooler season, resulting in physical damage to the roofing shingles. Therefore, provision must be made for the temperature relief of the attic space at all times.

BRIEF SUMMARY OF THE INVENTION

The present invention is concerned with improved forms of automatically operated gable vents and the like, and is particularly concerned with their use in conjunction with a solar heat augmented heating system. Specifically, a solar heat air chamber is provided in an attic space immediately below the roof structure, the attic space being vented automatically according to this invention. The solar heat chamber provides a reservoir of heated air which may be controllably inducted into a conventional hot air heating system through an auxiliary air inlet.

BRIEF DESCRIPTION OF THE DRAWING FIGURES

FIG. 1 is a perspective view, partly broken away, of a dwelling having the solar heat augmentation of this invention;

FIG. 2 is an enlarged section of a portion of the dwelling of FIG. 1;

FIG. 3 is an enlarged section of the intake end of the solar heat air intake;

FIG. 4 is a schematic electrical diagram of the basic control system;

DETAILED DESCRIPTION OF THE INVENTION

Figure 5:
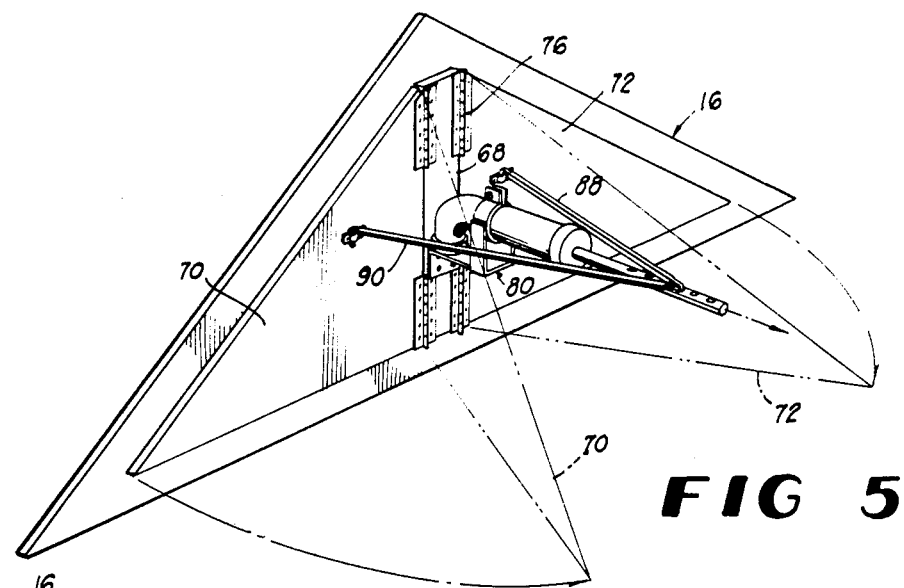
FIG. 5 is an enlarged perspective of a gable vent construction according to this invention.

Referring to FIG. 1, a building structure 10 is illustrated therein, the structure being of the general type employed for dwellings or private houses. In particular, the lower portion 12 of the building defines the usual occupant space whereas the space 14 (see FIG. 2) immediately below the roof structure is an insulating air space or attic. As is conventional for such constructions, a gable vent 16 is located in each end wall section 18 to prevent excessive heat build-up in the attic space.

In the building construction as shown, the usual rafters 20 are employed to join with the ridge member 22 and the lower portion 24 of the roof on that side which is most exposed to solar radiation, is provided with the usual roof covering and roofing material (i.e., shingles) whereas the upper section 28 is provided with translucent, shingle-simulating material in the form of a plastic sheet or sheets 30. The sheet 30 is pigmented to conform with the appearance of the conventional shingles or roofing material of the lower section 24, but is transparent to the infra red spectrum of solar radiation. The sheet 30 is applied directly to the rafters 20 as is illustrated in FIG. 2 and extends the length of the roof structure for a width W as illustrated in FIG. 1.

A sheet (or sheets) of material 32 is secured to the undersides of the rafters 20 and spaced therefrom by suitable spacer members 34 (FIG. 2) in order to cooperate with the ridge member 22 and the material 30 to define a hot air collection chamber.

In the cooler and winter months, this chamber will act as a hot air reservoir for purposes presently apparent and, for this purpose, the material 32 is painted flat black as indicated by stippling.

The building of FIG. 1 is provided with a forced air heating system which, as is conventional, comprises a furnace or heat generating unit 36 which includes a fan having an inlet 38 which draws air from the occupant space to be heated, and an outlet 40 which directs the heated air to the occupant space. According to this invention, the heating system is provided with an auxiliary inlet 42 which extends into the solar heat chamber to terminate in the upper reaches thereof substantially midway between the ends of the roof structure, as is indicated by the equal spacings 44 and 46 in FIG. 1.

An automatically controlled valve or damper plate 48 is provided adjacent the intake end of the auxiliary inlet 42, the automatic operation thereof being effected by the actuator 50 shown in FIG. 3. The actuator 50 may take any desired form so long as it is capable of closing the valve 48 when the temperature within the solar heat chamber falls below about 85° F. In this position, the valve 48 is in the full line position of FIG. 3 where it engages the sheet metal stop 52. The actuator 50 should be effective to open the valve 48 relatively rapidly as the temperature rises above 85° F., ultimately to reach the fully open position shown in phantom lines where it engages against the stop 54.

The operation of the system will be evident from FIG. 4 and the following description. In FIG. 4, the thermostatically controlled switches 56 and 58 are in series with the contactor or control device 60 which energizes the fan of the heating unit 36. The switch 58 and/or its sensor is located in the solar heat chamber (see FIG. 2) and this switch is actuated to closed position when the temperature within the solar heat chamber is at or above about 85° F. The switch 56, on the other hand, is controlled by the temperature in the occupant space, as is the heating system thermostatically controlled switch 62. However, the switch 56 opens at a temperature about 4° F. higher than the temperature at which the switch 62 opens. The switch 62 controls the heat supply control device 64 which may be a gas valve, electric heater element control relay, or the like. The switch 66 is the conventional fan control switch actuator thermostatically controlled to close when the plenum temperature of the heating unit 36 rises to a selected value.

In operation, assuming that the occupant space is cooling and that the temperature of the air contained in the solar heat chamber is greater than 85° F., the valve 48 will be in open position and the switch 58 will be closed. Thus, when the temperature in the occupant space falls below that value at which the switch 56 opens (say 70° F.), the circuit will be completed through the switches 56 and 58 to the fan control 60 and the heated air in the solar heat chamber will be circulated into the occupant space. If the solar energy available in this way is insufficient to restore the heat losses from the occupant space, the temperature in the occupant space ultimately will fall to that value (66° F. in this example) at which the switch 62 closes, thus initiating a normal heating cycles of the heating unit 36.

The auxiliary inlet 42 may be provided with a manually operated valve or damper 49 to prevent induction of hot air during summer months when the fan is used for cooling circulation or if the unit is provided with an air conditioning system.

Figure 6:
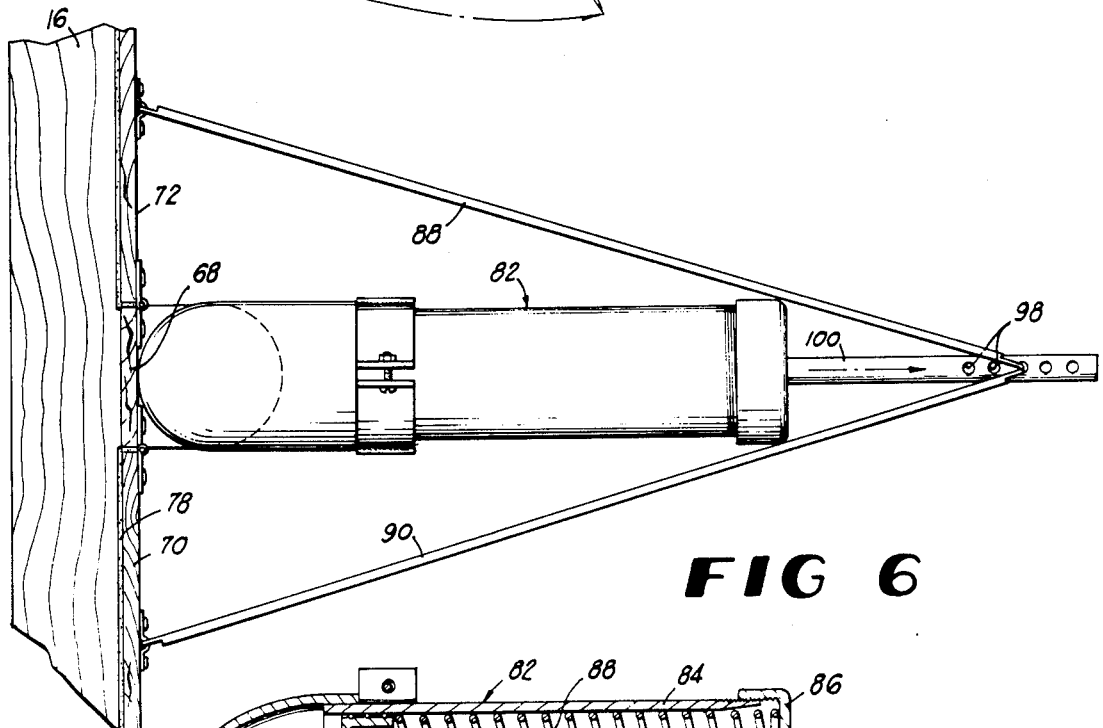
FIG. 6 is a sectional plan view of the assembly shown in FIG. 5.
Figure 7:
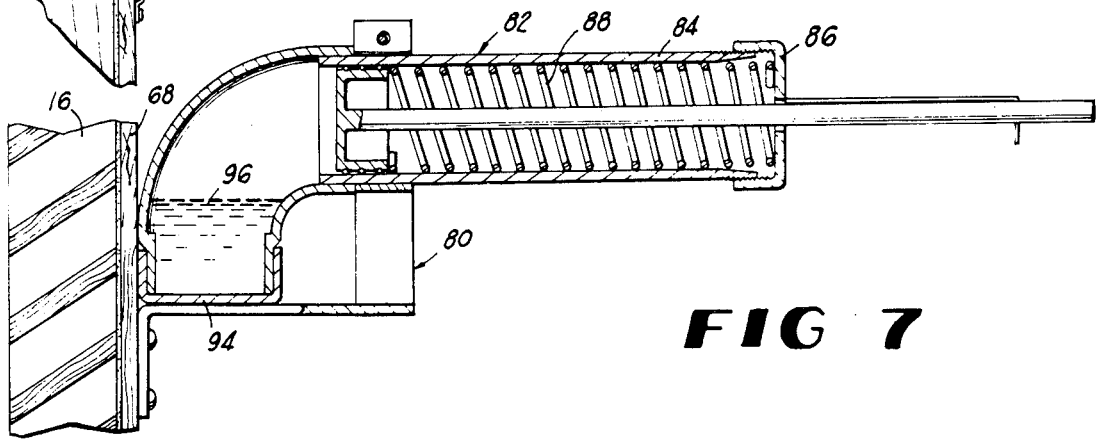
FIG. 7 is a longitudinal section taken through the actuator of FIGS. 5 and 6.

As noted above, the building construction conventionally employs gable vents such as that indicated by the reference character 16 in FIG. 1. According to this invention, means is provided automatically to open and close these vents. One such arrangement is illustrated in FIGS. 5–7. In FIGS. 5 and 6, a prefabricated gable vent 16 has been provided with the closure assembly which consists of the mounting strip 68 to which the two closure wings 70 and 72 are hinged as at 74 and 76. The marginal regions of the members 70 and 72 may be provided with foamglass cushioning and sealing strips 78, as shown and the strip 68 mounts the bracket 80 which holds the actuator 82. The actuator is in the form of a piston/cylinder device including the tubular portion 84 within which the piston 86 slides, the portion 84 being provided with a removable end cap 86 upon which one end of the compression spring 88 is seated. The opposite end of the spring bears against the piston 86 normally to urge it inwardly as shown in FIG. 7 until the links 88 and 90 have urged the members 70 and 72 to fully closed positions. An elbow member 92 is secured to the inner end of the cylinder 84 and is capped as at 94 to define a closed chamber within which a reservoir of low boiling point liquid 96 (Freon 114) is trapped. The ends of the links 88 and 90 are engaged in one of the apertures 98 of the piston rod 100 such that the preload imposed by the spring 88 assures adequate seating of the members 70 and 72 when the temperatures within the attic or insulating air space 14 is below about 75° F. At temperatures above about 40° F., the vapor pressure of the liquid 96 begins to increase and at about 75° F. the vapor pressure is sufficient to overcome the frictional resistance of the piston 86 and the preload of the spring 88 so that the piston begins to move. When the attic temperature reaches about 100° F., the piston is extended sufficiently so that the doors or members 70, 72 are fully open. The actuator 50 of FIG. 3 is preferably of similar type except that the valve 48 should be fully closed when the temperature falls to or below about 85° F. in the solar heat chamber.

Figure 8:
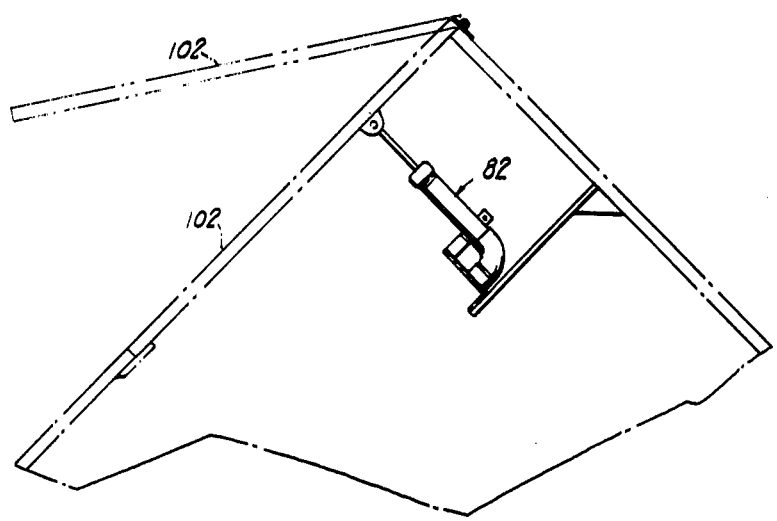
FIG. 8 is a phantom perspective illustrating another form of attic vent.

In FIG. 8, the actuator 82 is shown applied to a different type of attic venting system which, as shown, simply involves the roof opening door 102 movable between closed and open positions.

Figure 9:
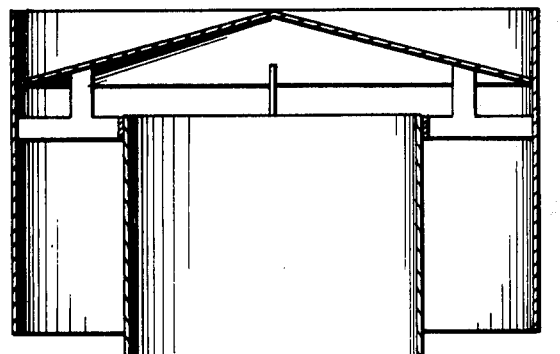
FIG. 9 is a vertical section taken through a roof vent structure according to this invention.

In FIG. 9, an actuator 50 is employed to operate the valve 104 provided in an otherwise conventional roof vent 106.

In all instances, the automatic vent control is effective to prevent the build-up of excessive heat in the attic or insulating air space immediately below the roof while, at the same time terminating the venting action when ambient air temperature conditions would otherwise vent air of undesirably cool temperatures into the attic space.

Figure 10:
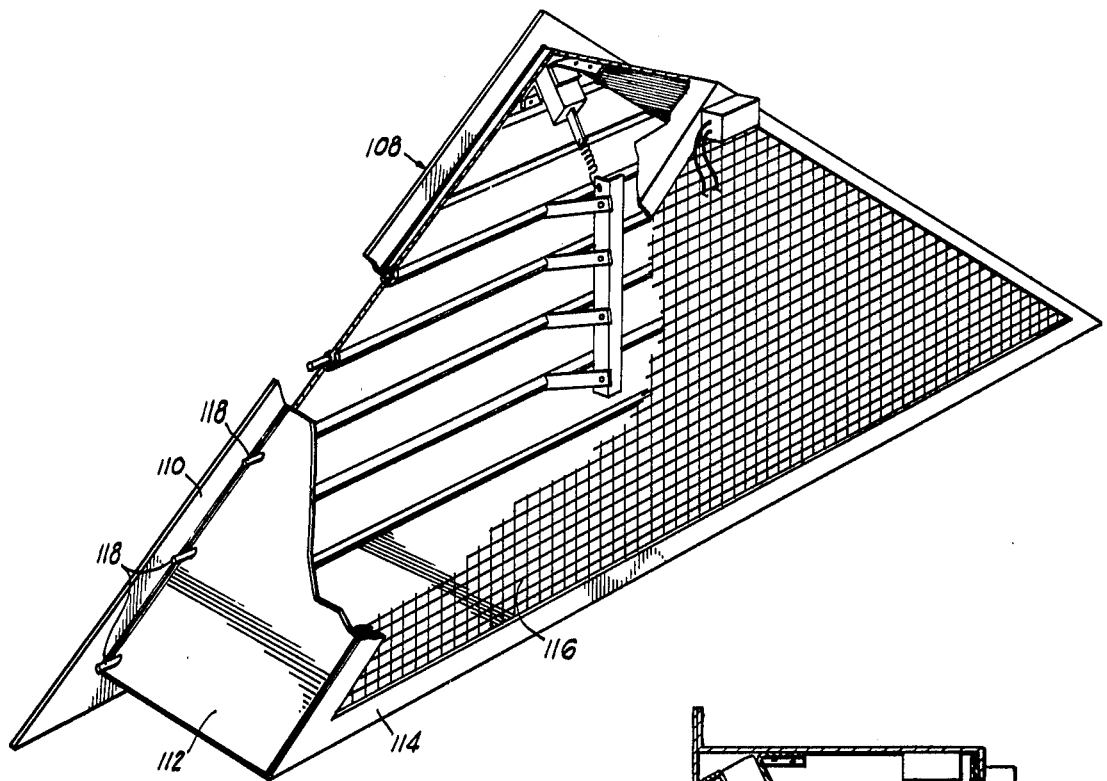
FIG. 10 is a perspective view of a prefabricated gable vent unit according to this invention.
Figure 11:
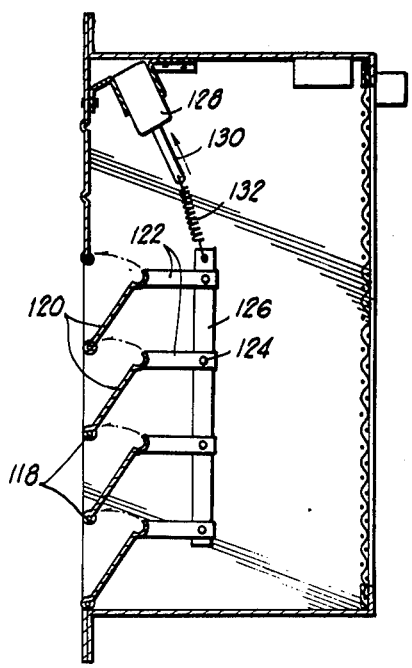
FIG. 11 is a vertical section taken through the unit of FIG. 10.
Figure 12:
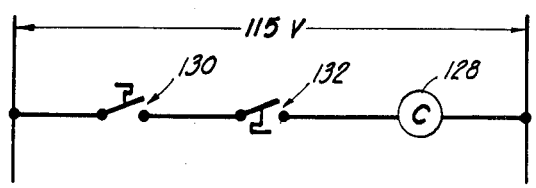
FIG. 12 is a schematic electrical diagram of the control system employed with the gable vent unit of FIGS. 10 and 11.

FIGS. 10 and 11 illustrate an integral gable vent construction which may be supplied as a complete unit for installation. As shown, a sheet metal frame 108 of generally triangular, open form defines a vent opening bounded by the outer marginal flange 110 thereof. The body portion 112 likewise is of triangular form and is joined with an inner triangular flange 114. This entire body structure may be formed as an integral stamping. The inner flange 114 mounts a grille or screen 116 which serves to prevent the entry of birds and the like into the attic space, and the body portion 112 adjacent the outer flange mounts a series of horizontal rods 118. Each rod pivotally mounts a louvre 120 as is best illustrated in FIG. 11, and each louvre is provided with an ear 122 which is pivoted as at 124 to the common link 126. The louvres extend upwardly from their associated rods so that they tend normally to swing downwardly into open position as shown in FIG. 11. The actuator in this embodiment is in the form of a solenoid 128 having a movable armature 130 connected by means of the tension spring to the upper end of the link 126. When energized, the solenoid moves the armature in the direction of the arrow in FIG. 11 to close the vent unit. The solenoid is energized under control of the two thermostatically controlled switches 130 and 132 shown in FIG. 12. The switch 130 is responsive to ambient temperature and is adapted to open when the ambient temperature is less than a temperature of about 50° F. whereas the switch 128 is adapted to open when the temperature within the attic space exceeds a temperature of about 100° F. Since the usual climatic conditions over each year will more often establish an open condition of one or the other of the switches 130 and 132, the solenoid 128 will be energized for only a minor amount of time per year. Thus, the normal open position of the louvres 120 which is effected by gravity represents a distinct saving in electrical energy.

I claim:

1. An automatically operating vent structure for venting an attic space, comprising a movable valve member and an actuator connected to said valve member to move the same back and forth between open and closed positions, said actuator being in the form of a piston-cylinder device defining a closed expansible chamber, a charge of low boiling point liquid in said chamber, a spring normally biasing said piston against vapor pressure generated by said liquid, said movable valve member being in the form of a pair of hinged closure elements for the vent structure, a pair of operating links for the hinged closure elements pivotally connected thereto and also connected to the piston rod of said piston-cylinder device, said piston rod having plural longitudinally spaced apertures therein, and lateral extensions on the ends of said links remote from the hinged closure elements and being selectively engageable in different ones of the apertures to adjust the preload of said spring.

2. An automatically operating vent structure for venting an attic space as defined in claim 1, and said vent structure comprising a prefabricated vent panel, a mounting strip for said pair of hinged closure elements on said prefabricated vent panel, and said closure elements being hinged directly to opposite sides of the mounting strip.

* * * * *